(12) United States Patent
Ellingson (10) Patent No.: US 6,895,716 B2
(45) Date of Patent: May 24, 2005

(54) PEELABLE SUSPENSION CABLE POSITIONING APPARATUS AND METHOD

(76) Inventor: David Irwin Ellingson, 918 S. 8th Ave. West, Newton, IA (US) 50208

(*) Notice: Subject to any disclaimer, the term of this patent is extended or adjusted under 35 U.S.C. 154(b) by 81 days.

(21) Appl. No.: 10/456,126

(22) Filed: Jun. 5, 2003

(65) Prior Publication Data

US 2004/0244306 A1 Dec. 9, 2004

(51) Int. Cl.⁷ .................................................. A62B 1/06
(52) U.S. Cl. ........................ 52/146; 52/148; 52/741.1; 182/82; 182/73; 248/74.2
(58) Field of Search ....................... 52/146, 148, 149, 52/741.1; 182/82, 73, 10; 248/74.2

(56) References Cited

U.S. PATENT DOCUMENTS

| 734,230 | A | | 7/1903 | Hillier | |
|---|---|---|---|---|---|
| 1,069,088 | A | | 7/1913 | Taylor | |
| 1,429,776 | A | * | 9/1922 | Robinson | ................... 248/74.2 |
| 2,088,514 | A | | 7/1937 | Glover | |
| 2,122,908 | A | * | 7/1938 | Collins | ........................ 187/406 |
| 3,248,831 | A | * | 5/1966 | Jones | ........................... 52/121 |
| 3,726,054 | A | * | 4/1973 | Anderson et al. | .............. 52/23 |
| 3,944,021 | A | * | 3/1976 | Smith et al. | ................... 182/3 |
| 3,994,108 | A | * | 11/1976 | Johnson | ....................... 52/247 |
| 4,006,884 | A | | 2/1977 | Lederhos | |
| 4,122,917 | A | | 10/1978 | Kendrick | |
| 4,256,199 | A | | 3/1981 | Sellards | |
| 4,341,286 | A | | 7/1982 | Gregory | |
| 4,538,704 | A | | 9/1985 | Forrest | |
| 5,038,536 | A | | 8/1991 | De Mendoza Sans | |
| 6,070,837 | A | * | 6/2000 | Bond | .......................... 248/71 |
| 6,774,302 | B2 | * | 8/2004 | Conte et al. | .............. 174/40 R |

\* cited by examiner

Primary Examiner—Brian E. Glessner (57) ABSTRACT

Rapid deployment of a suspension cable is a supportive system to several high-rise building rescue methods. A cable is pre-attached in a peelable manner to the building side and rigidly attached to the building top. An emergency chase vehicle is dispatched to the building base, attaches to the lower end of the cable and then moves away from the building. The cable peels off the building and suspends from the building top to the ground at approximately a 45 degree angle. A high-rise building rescue method now utilizes this deployed suspension cable.

19 Claims, 8 Drawing Sheets

PEELABLE SUSPENSION CABLE POSITIONING APPARATUS AND METHOD

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This invention relates to high-rise building fire rescue, specifically to an apparatus and method to rapidly deploy a suspension cable from an upper floor of a high-rise building to the ground. The suspension cable would be used to facilitate building occupant evacuation or firefighter access to an upper floor. Several patents outline evacuation or access mechanisms once the suspension cable is installed. An evacuation mechanism example is U.S. Pat. No. 2,088,514 granted on Jul. 27, 1937 to Glover. An access mechanism example is U.S. Pat. No. 4,256,199, granted to Sellards on Mar. 17, 1981.

Present art methods for high-rise building cable positioning fall into four areas. None are in general use due to limitations, which will be outlined.

The gravity drop method is disclosed in U.S. Pat. No. 734,230 granted on Jul. 21, 1903 to Hillier. This gravity drop method requires a length of cable to be positioned at the top of the building and released. The limitation to this method is the requirement that the building have no mid-height roof line. The cable would stop at this roof line and not reach the ground. Another gravity drop limitation is wind buffeting the cable resulting in uncertainty of grasping the cable end at ground level.

The cannon shoot method is disclosed in U.S. Pat. No. 1,069,088 granted on Jul. 29, 1913 to Taylor. A method is used to propel the cable from the ground to the building upper floor. The cable and grappling hook would arch toward the building. The major limitations of this method are wind buffeting and uncertainty of the cable end properly engaging the building. Due to weight limitations in flight, the cable would need to be very light in weight. Thus, the cable strength would also be a limitation.

The helicopter method is outlined in U.S. Pat. No. 4,256,199, granted to Sellards on Mar. 17, 1981. A limitation of this method is the inability to perform the helicopter flight under poor conditions such as wind or reduced visibility due to smoke or fog. Other limitations include quick response of an available helicopter and sufficient operator skill in performing the cable transfer.

A last method is to have the cable be permanently installed as outlined in U.S. Pat. No. 5,038,536, granted to De Mendoza Sans on Aug. 13, 1991. A limitation of this method is aesthetics. Multiple cables angling down from a high-rise building would detract from the building architecture. Due to limited space, a permanent cable attachment may not be possible. In a city with close proximity of high-rise buildings, the multiple permanent cables would overlap causing clearance issues. Also, an existing street may be the only option for the lower attachment point. These limited space conditions would necessitate a temporary cable method.

SUMMARY OF THE INVENTION

The object of the invention is to provide rapid deployment of a suspension cable from an upper floor of a high-rise building to the ground. The invention is a positioning system that is composed of a cable attached from the building base to an upper floor. This cable is peeled away from the building to then suspend from the building top to a ground location away from the building base.

In operation, a fireman would be dispatched to the building base in a chase vehicle. The fireman would attach the lower end of the cable to the chase vehicle and drive away from the building base. As the cable is pulled, it exerts sufficient force to be peeled away from the building. The cable attachment method to the building side is only strong enough to prevent the cable from being dislodged due to weather or inadvertent contact.

The cable peels until it reaches the upper cable end. The upper cable end is permanently attached to the upper floor of the building. The chase vehicle is now a sufficient distance away from the building base and the cable suspends from the upper floor to the ground. The suspension cable is now ready for rescue use.

On a very tall high-rise building, it may be desired to have cables attached at several upper floor heights. As an example, on a 90 floor building, it may be desired to place cables at the $30^{th}$, $60^{th}$ and 90th floors. This would provide evacuation or firefighter access within a moderate distance to any building floor.

Advantages of this invention include the following. The building and building occupants are passive in the deployment of the suspension cable. No building occupant participation is required and no fireman access to the high-rise building upper level floor is required. Deployment is completely controlled by firemen. The firemen would be trained and practiced in the procedure. No electrical power or stored energy is required from the building or the rescue device on the building. The cable positioning system is not affected by weather or smoke. The system is temporary, which allows the ground end to be placed in a street. There is no significant impact to building aesthetics. It is also possible to use light weight breakaway coverings for the cable and have it be completely hidden from view. Strong cable can be used. An example cable would be a ⅝ inch galvanized steel wire rope with a nominal strength of 16 tons. The cable could be constructed of any material strong enough to withstand the peeling operation and rescue usage. Some example materials include steel wire, natural rope and polymeric rope. The cable would be flexible enough for the fireman to manually flex and attach to the chase vehicle.

Another advantage of the present invention is the ability for the cable to peel over a mid-height roof line. The gravity drop method was ineffective with this type of impediment. Many high-rise buildings include these horizontal roof lines at various floor levels. In operation, the cable peels off both the vertical building surfaces and also the horizontal roof lines (or any mid angle transition building surfaces.) A pulley is provided at the horizontal to vertical transition to redirect the cable force.

Another advantage of the present invention is the ability to position the suspension cable over an impediment such as a skywalk. In operation, after attaching the cable at the base of the high-rise building, the chase vehicle drives to the skywalk location, partially peeling the cable. This first cable is then attached to a second cable that is peelably attached over the skywalk. A second chase vehicle connects to the second cable and peels it from the skywalk. The now connected first and second cables then suspend from the high-rise building upper floor to the second chase vehicle on the ground.

An alternate embodiment of the invention uses a powered winch in place of the chase vehicle. The peelable cable extends from the winch across the ground and up the building. The winch winds in the cable causing it to peel and suspend. When fully wound, the cable extends from the winch to the upper floor of the high-rise building.

DETAILED DESCRIPTION OF THE INVENTION

Figures 1, 2, 3:
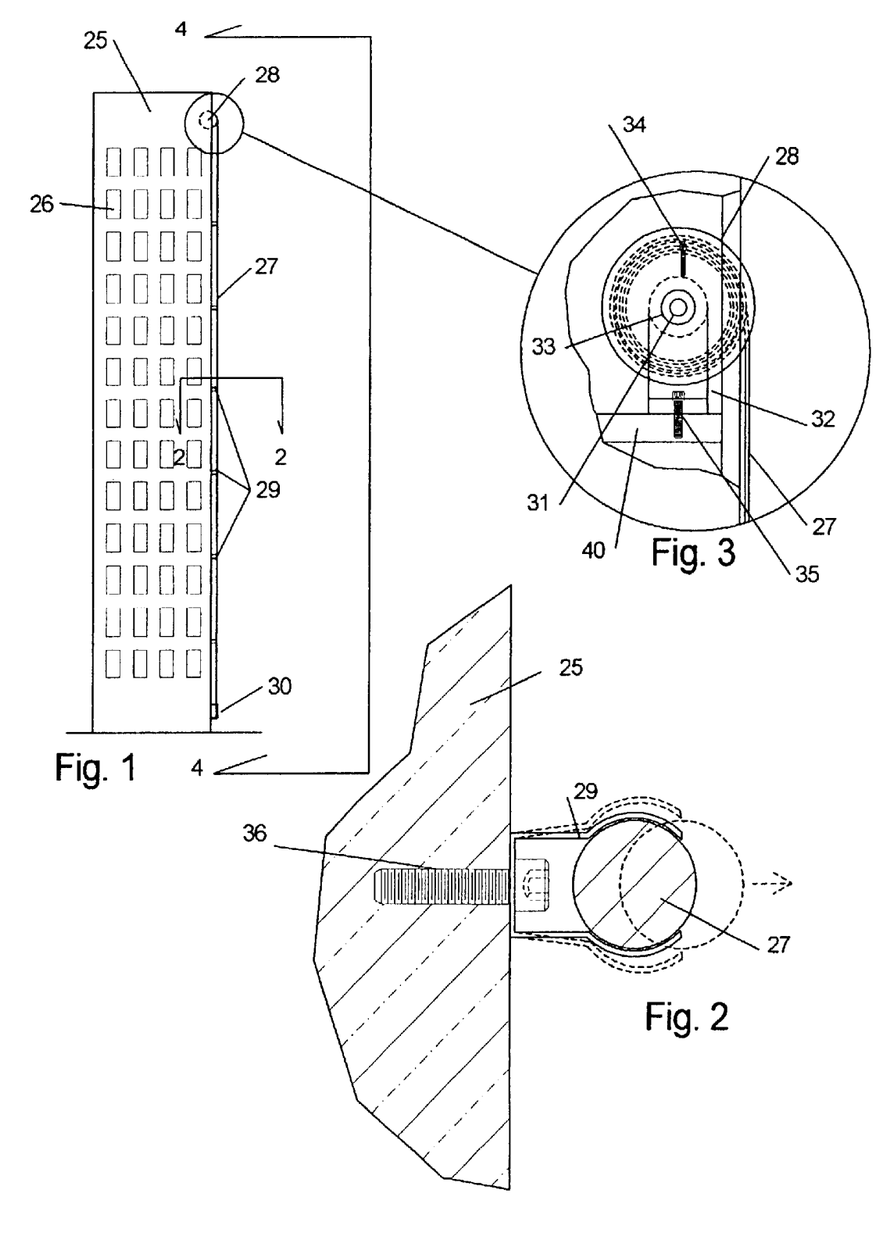
FIG. 1 is a side view of a high-rise building showing the attached cable.
FIG. 2 is an enlarged section view of a clip holding the cable—taken along section lines 2—2 from FIG. 1.
FIG. 3 is an enlarged side view of the cable spool.

FIG. 1 shows the side view of a high-rise building 25 with a plurality of windows 26. A cable 27 is shown attached to the building. The cable 27 first exits the building at the cable spool 28, runs down the high-rise building 25 and enters the access box 30. The cable 27 is attached to the high-rise building 25 with a plurality of peelable clips 29. The interval of spacing for the peelable clips 29 would be quite variable depending on the clip design and other requirements. The cable 27 is shown spaced further away from the building than in actuality to allow clarity in the drawing view. For purposes of aesthetics, it would even be possible for the cable to be in a recess groove in the building.

FIG. 2 shows an enlarged section view of the peelable clip 29 attached to the high-rise building 25 with a clip attachment bolt 36. The peelable clip 29 would be made from a material such as spring steel and would firmly hold the cable 27 in position. The cable 27 would be constrained by the peelable clip 29 from either vertical or horizontal motion.

However, with enough horizontal force, the cable 27 would flex the peelable clip 29 and release. This motion is shown with the dashed lines in FIG. 2. This motion is called being peelable, as in peeling the cable 27 from the high-rise building 25. There are a plurality of variations on the function of the peelable clip 29. Any method that would hold the cable 27 under nominal force and release with a higher force would suffice. Other possibilities include a rubberized flexible holder, adhesive or a plastic covering device.

FIG. 3 shows an enlarged side view of the cable spool. It is desirable to have the suspension cable 27 run from the top of the high-rise building 25 to the ground at approximately a 45 degree angle. The function of the cable spool 28 is to hold an amount of additional cable 27 to allow this 45 degree angle. There are a plurality of wraps of the cable 27 around the cable spool 28. The cable 27 terminates with an attachment to the cable spool 28 via a cable termination bolt 34. When the cable 27 is fully suspended, this termination point to the cable spool 28 allows substantial tension on the cable 27 to be resisted. The cable spool 28 rotates on a shaft 31 via bearings 33. The bearings 33 are attached to the cable spool support 32 which is attached to the high-rise building floor 40 via support bolts 35.

Figure 4:
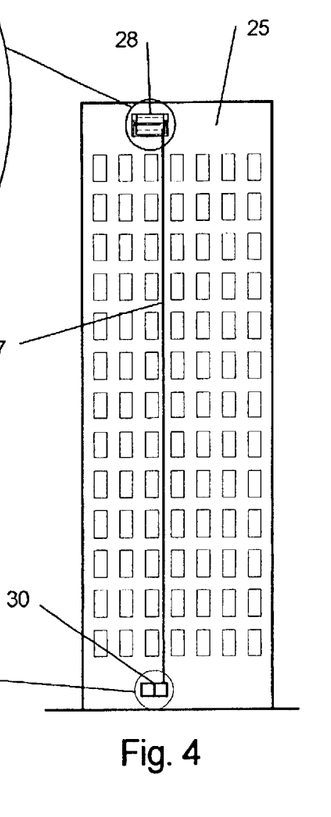
FIG. 4 is a section view of the building front showing the cable spool, attached cable, and access box—taken along section lines 4—4 from FIG. 1.

FIG. 4 shows a section view of the high-rise building 25 front. The front view of the cable spool 28 is shown. The cable 27 is shown leading from the cable spool 28 to the access box 30.

Figure 5:
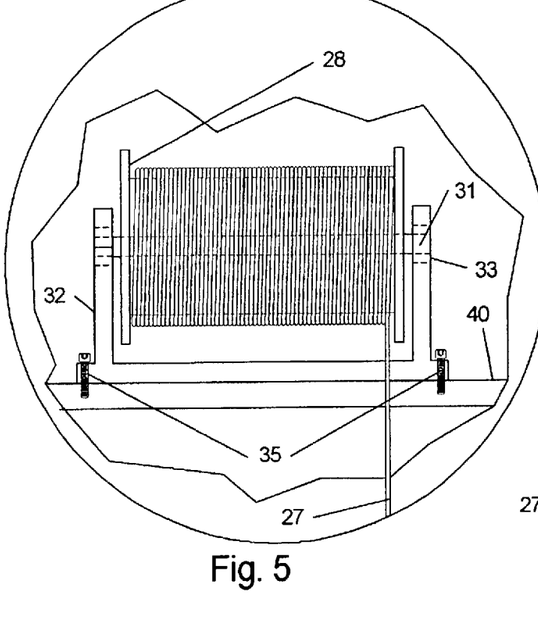
FIG. 5 is an enlarged front view of the cable spool.

FIG. 5 shows an enlarged front view of the cable spool 28. This view shows many of the same parts as FIG. 3.

Figure 6:
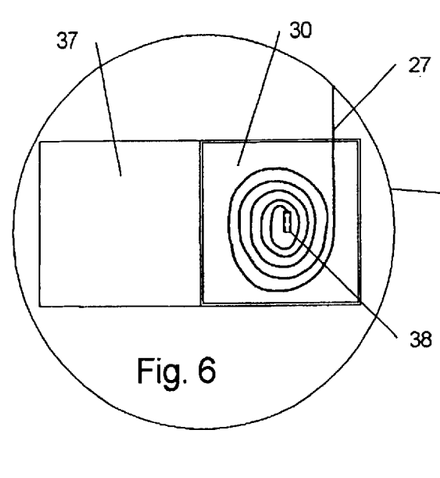
FIG. 6 is an enlarged front view of the access box.

FIG. 6 shows an enlarged view of the access box 30. The access box cover 37 is shown in the open position. The cable 27 enters the box at the top and is coiled several times. The cable 27 terminates with the cable female connector 38. The coiled cable 27 and cable female connector 38 would be neatly held in place in the access box 30, but would be removable by a fireman. Clips or light duty adhesive would provide this function. The access box cover 37 provides security from vandalism for the cable male connector 38.

Only a fireman or maintenance person would have key or password access to open the access box cover 37.

Figures 7, 8:
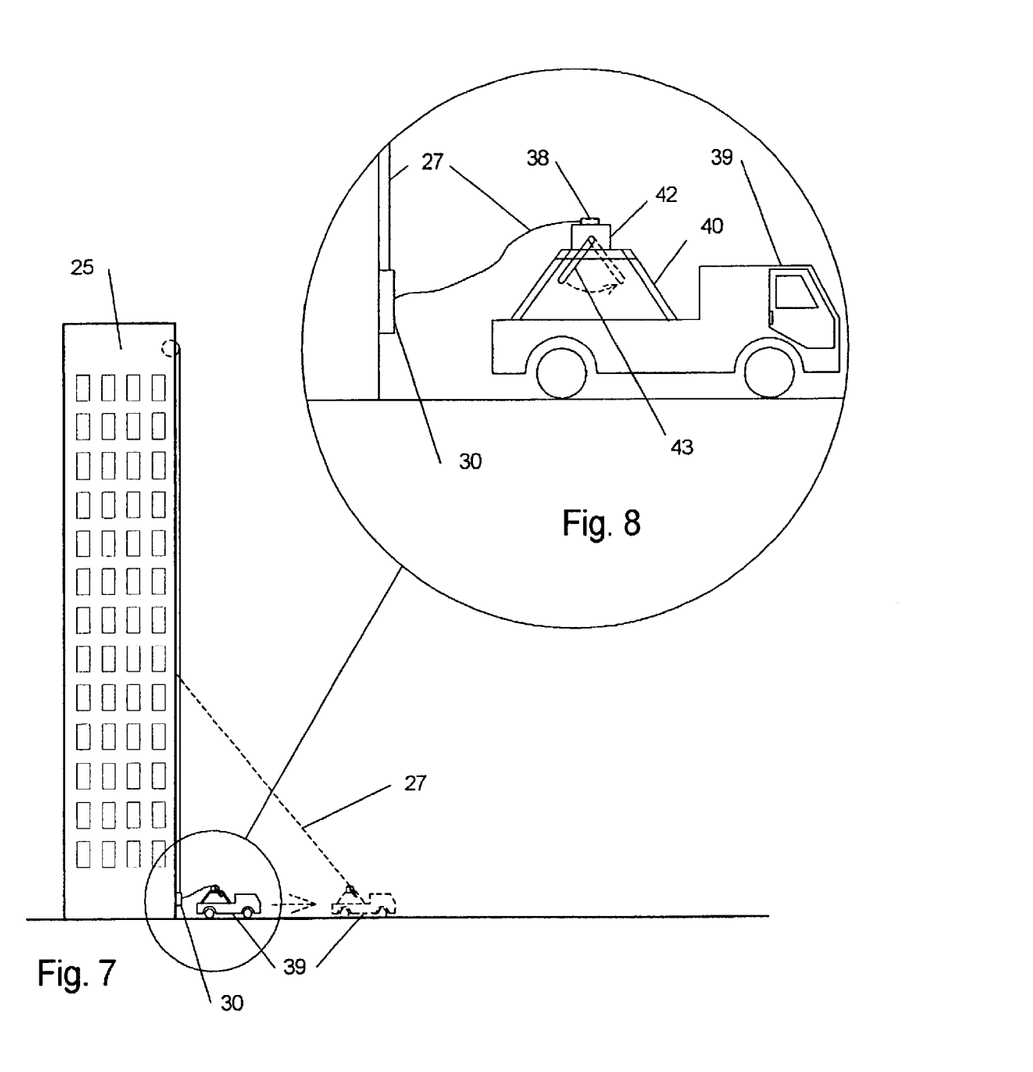
FIG. 7 is a side view of a high-rise building showing the chase vehicle attachment to the cable and initial peeling of the cable.
FIG. 8 is an enlarged view of the chase vehicle showing the cable attachment method.

FIG. 7 shows a side view of the high-rise building 25 with the chase vehicle 39 positioned near the access box 30.

FIG. 8 shows an enlarged view of the chase vehicle 39. In operation, the chase vehicle 39 would have been dispatched to this particular access box 30. Upon arrival, a fireman would then open the access box 30, remove the cable female connector 38 and pull the cable 27 out of the access box 30. The several coils of cable 27 in the access box 30 would unwind as the fireman pulls and places the cable female connector 38 on the attachment box 42. While holding the cable female connector 38 on the attachment box 42, the fireman would then rotate the attachment lever 43 from the vehicle rear position to the vehicle forward position. This lever motion would cause the attachment box 42 to clamp onto the cable female connector 38. The support structure 40 fixtures the attachment box to the chase vehicle 39. After the cable female connector 38 has been clamped to the attachment box 42, the chase vehicle would then proceed away from the high-rise building 25. This chase vehicle 39 motion would cause the cable 27 to peel up the high-rise building 25 as shown in the dashed example in FIG. 7.

For drawing simplicity, all the figures show the chase vehicle as a motorized truck. There are many options for a method to cause the cable 27 to peel up the high-rise building 25. General purpose motorized land vehicles include examples such as a truck, car, motorcycle or snowmobile. It may be necessary to move the chase vehicle over water to achieve the desired end location for the cable 27. General purpose motorized water vehicles include examples such as a boat or jet ski.

Also for drawing simplicity, the chase vehicle 39 is shown moving horizontally away from the high-rise building 25. In practice, the desired end point for the chase vehicle 39 travel may be higher or lower in elevation than the access box 30.

Figure 9:
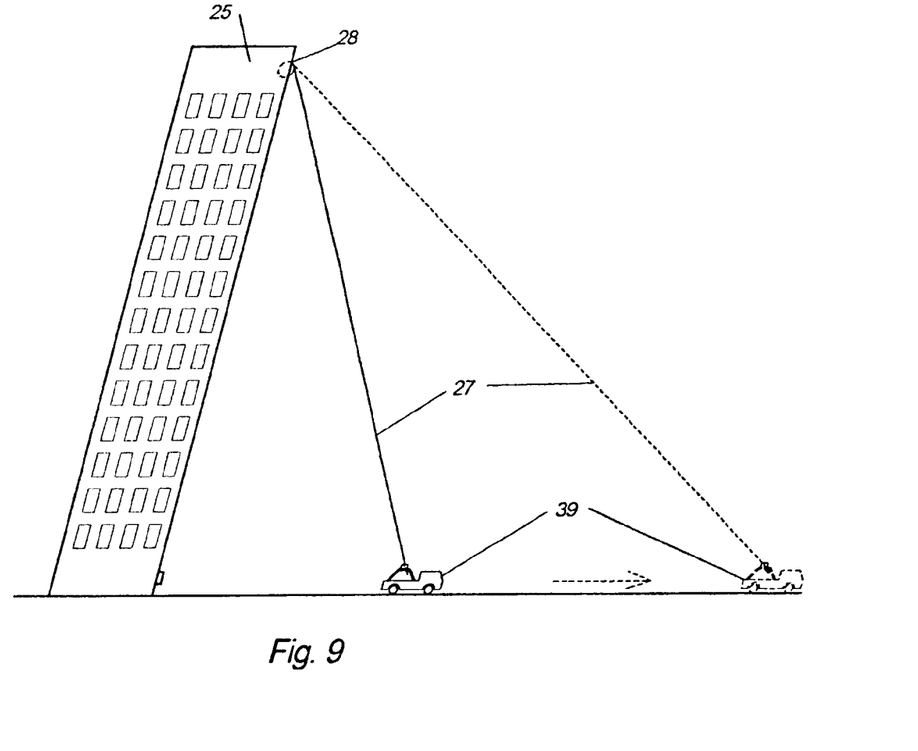
FIG. 9 is a side view of a high-rise building showing the chase vehicle pulling cable from the cable spool.

FIG. 9 shows a side view of the high-rise building 25 when the chase vehicle has fully peeled the cable 27. The cable 27 is now fully released from the side of the high-rise building 25. The cable 27 suspends from the cable pulley 28 to the chase vehicle 39. As indicated in the dashed motion, the chase vehicle 39 movement now causes the cable pulley 28 to rotate and extend the cable 27. The chase vehicle 39 stops when all the cable 27 is unwound. The cable termination bolt 34 now holds the upper end of the cable 27. The suspension cable 27 system is now ready for rescue operation.

Figures 10, 11, 12:
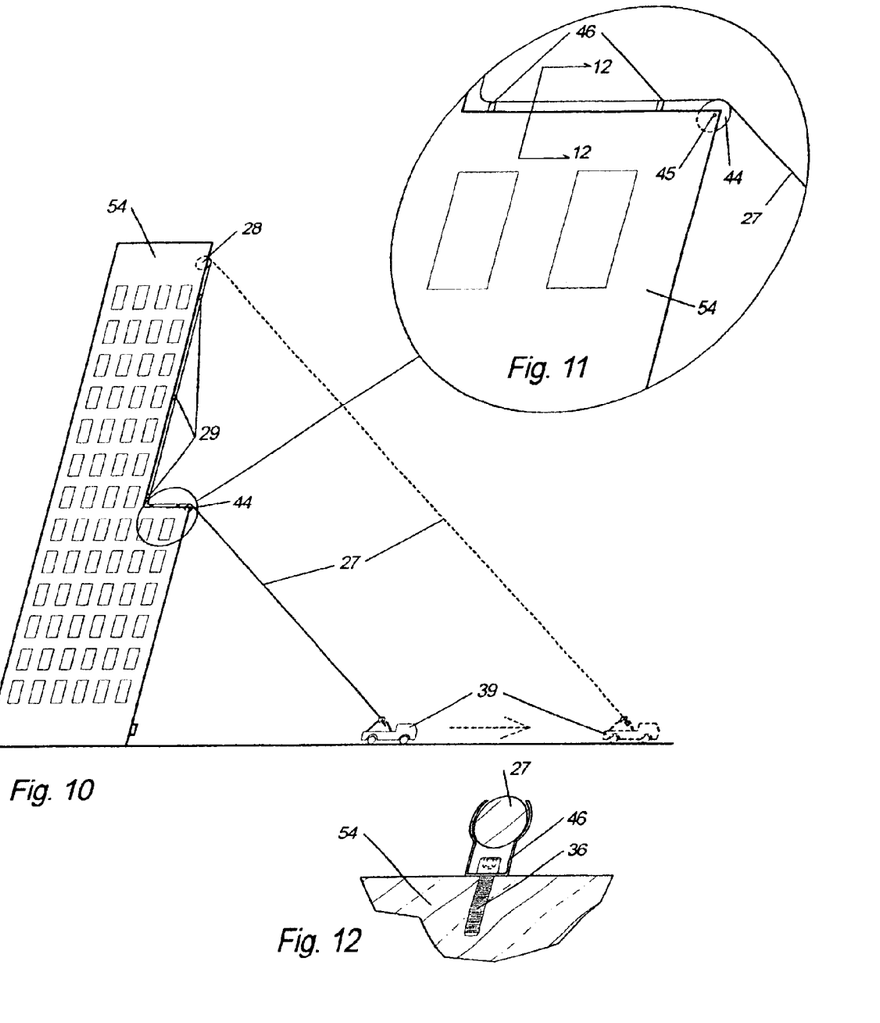
FIG. 10 is a side view of a high-rise building with a mid-height roofline.
FIG. 11 is an enlarged view of the mid-height roofline.
FIG. 12 is a section view of the mid-height roofline showing the sliding clip—taken along section lines 12—12 from FIG. 11.
Figures 10, 11:
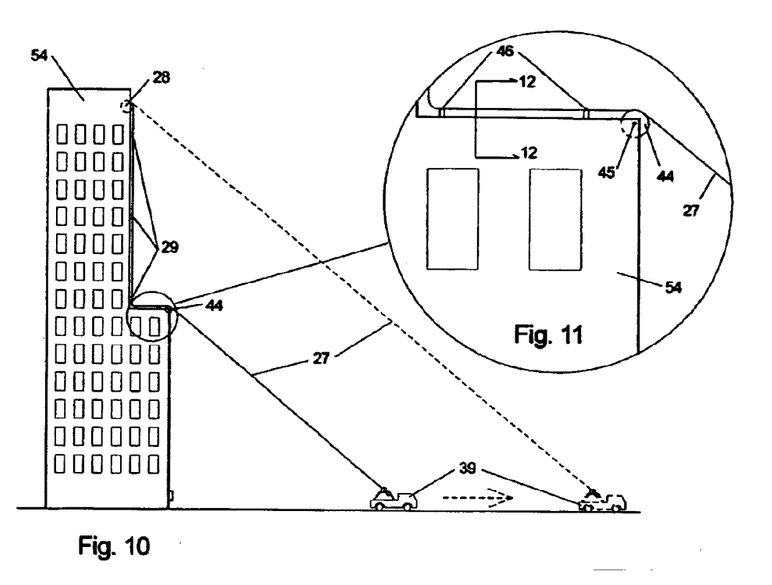
Figure 12:
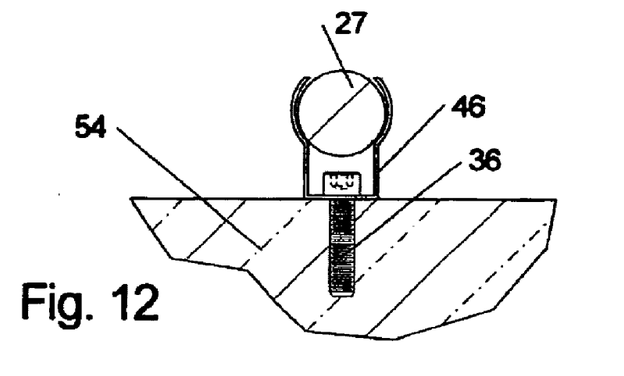

FIG. 10 shows a high-rise building with a mid-height roofline 54. The mid-height roofline requires the cable 27 to have a horizontal section in the path from the cable spool 28 to the access box 30. Where the cable 27 is attached vertically, peelable clips 29 would be used.

FIG. 11 shows an enlarged view of the mid-height roofline. The cable pulley 44 and cable pulley axle 45 provide a low friction method for the cable 27 force to be redirected from vertical to horizontal. The cable pulley axle 45 is fixed to the high-rise building with mid-height roofline 54. Sliding clips 46 are used where the cable 27 is attached horizontally. An alternative construction to the pulley 44 and pulley axle 45 would be a fixed surface to resemble a 90 degree arc of the pulley. This fixed arcuate surface would be attached to the building. The arcuate surface would be a simpler construction method to achieve the low friction force redirection.

FIG. 12 is a section view of the sliding clip 46. The sliding clip 46 is attached to the high-rise building with a mid-height roofline 54 with a bolt 36. The radius of the sliding clip 46 is large enough that the cable 27 is able to easily slide within the clip. The sliding clip 46 also functions like the peelable clip 29 when a sufficient force is applied outward from the clip base. The sliding clip 46 springs open and releases the cable 27.

Again referring to FIG. 10 and FIG. 1, as the chase vehicle moves, the cable 27 is supported by the rotating pulley 44 and slides in the sliding clips 46. The cable 27 continues to peel up the building and across the mid-height roofline. Eventually, the cable 27 peels out of the sliding clips 46, lifts off the pulley 44 and suspends.

Figure 13:
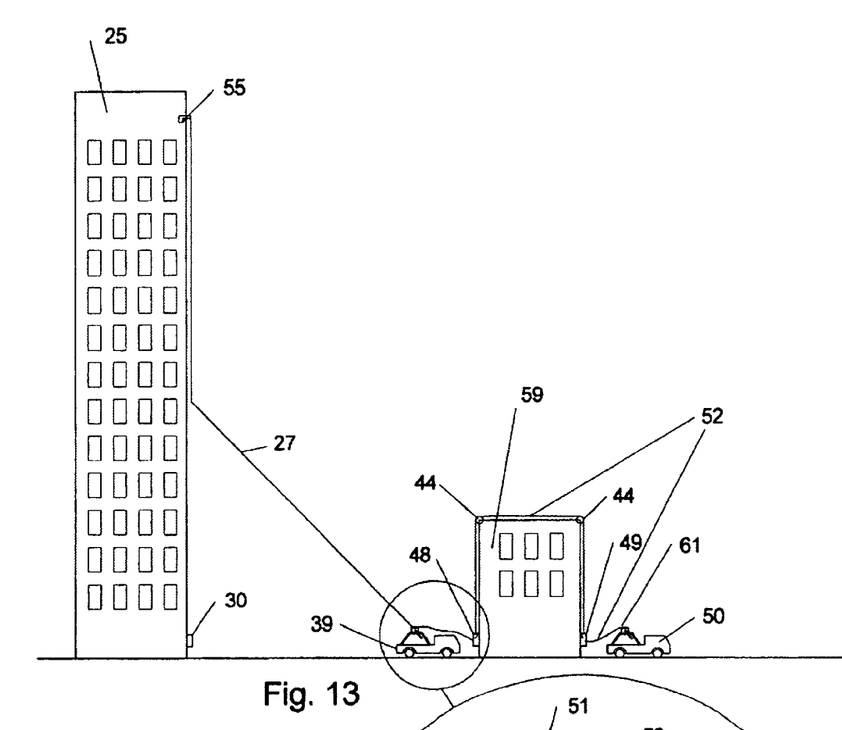
FIG. 13 is a side view of a high-rise building and a small height building.

FIG. 13 shows a high-rise building 25 with an impediment small building 59. This small building 59 is in the desired path of the chase vehicle 39. A skywalk would be another example of a building in the desired chase vehicle path. The normal path for the chase vehicle would be down the street that leads away from the high-rise building 25. Frequently, a sky walk would interrupt this path.

The solution to this interruption is a jumper cable 52. The operation would be as follows—referring to FIG. 13. Upon the alarm call, chase vehicle 39 would be dispatched to access box 30 and second chase vehicle 50 would be dispatched to second access box 49. The chase vehicles are identical. Chase vehicle 39 would make the attachment to the female connector 38 as described for FIG. 8. Second chase vehicle 50 would make the attachment to second female connector 61 in the same manner and at the same time.

Figure 14:
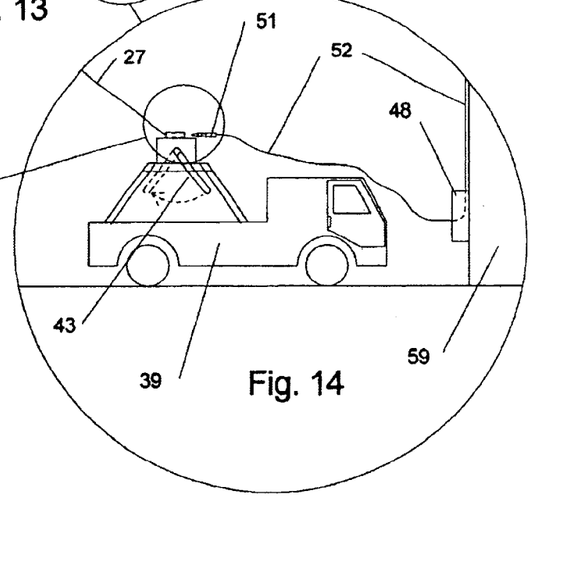
FIG. 14 is an enlarged view of the chase vehicle at the small height building.

Referring to FIG. 14—chase vehicle 39 would pull up close to third access box 48. Third access box 48 is identical to access box 30 with the exception that the jumper cable terminates with a male connector 53 rather than a female connector 38. The fireman would open the third access box 48, remove the male connector 53 and pull to unwind the jumper cable 52.

Figure 15:
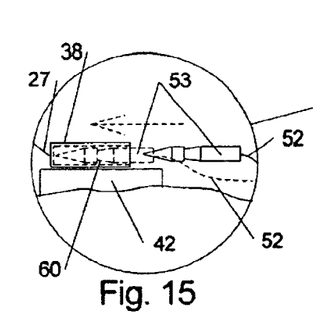
FIG. 15 is an enlarged view of the male and female cable connectors.

Referring to FIG. 15—the male connector 53 would be inserted into the female connector 38 (dashed lines). The male connector 53 would snap into place inside the female connector 38 when spring loaded detents 60 catch on the male connector 53 shoulder recess.

Again referring to FIG. 14—after the male connector 51 is snapped inside the female connector 38 and verification that second female connector 61 has been attached to second chase vehicle 50, the fireman moves the lever 43 to the vehicle rear position (dashed lines), thus releasing the clamp on the female connector 38. The cable path is now from the building anchor 55 to cable 27 to female connector 38 to male connector 53 to jumper cable 52 to second female connector 61 to second chase vehicle 50.

Figure 16:
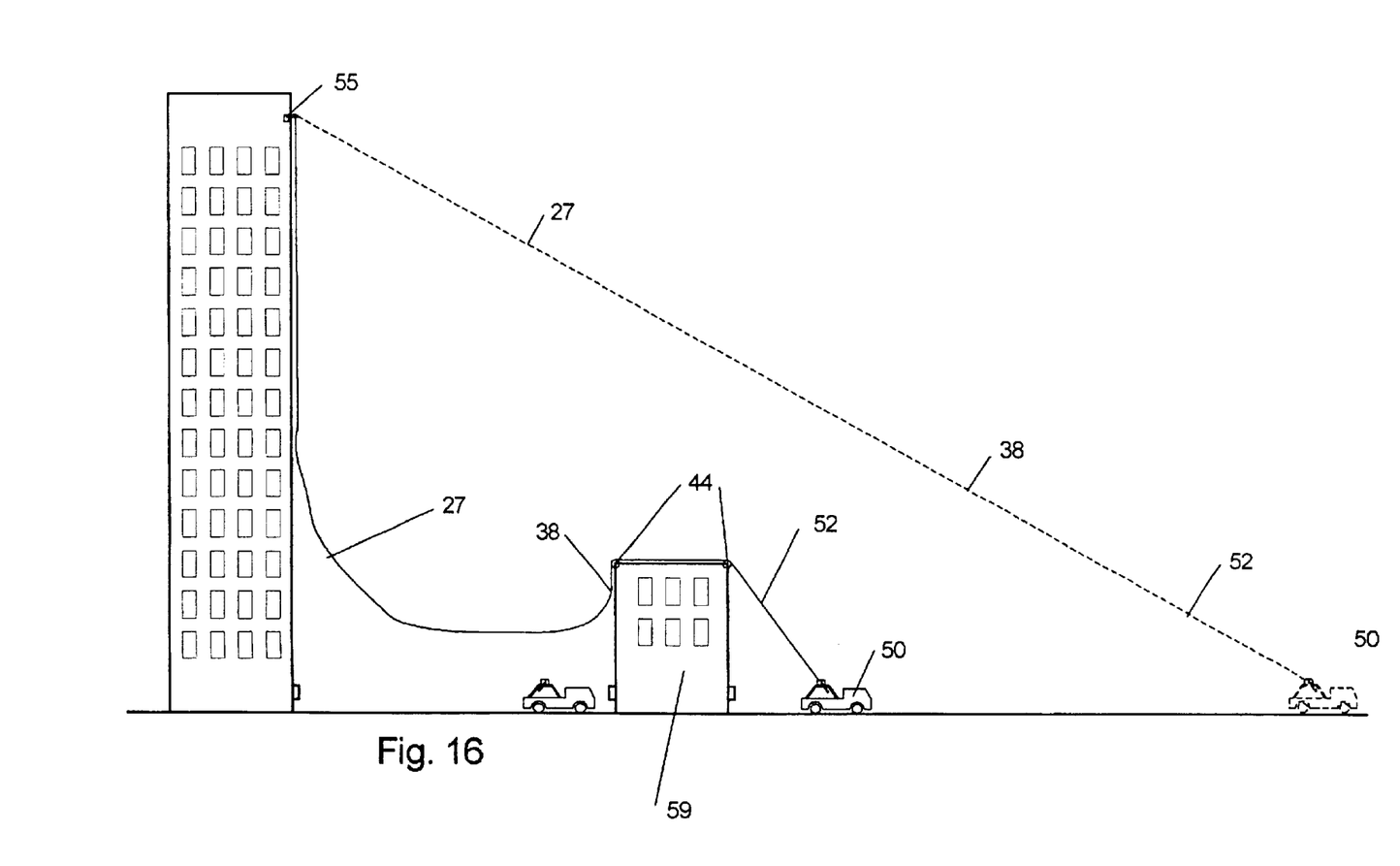
FIG. 16 is a side view of a high-rise and small height building after the connector transfer.

FIG. 16 shows second chase vehicle 50 pulling away from the small building 59. At first, jumper cable 52 peels from the side of the small building 59. It then slides across the top of the small building 59 due to force redirection via pulleys 44. Then, the slack is taken out of cable 27 and it begins peeling up the other side of the small building 59. It would be important for the female connector 38/male connector 53 assembly to be short enough in length such that the assembly can smoothly pass over the pulleys 44. Eventually, chase vehicle 50 pulls far enough that the cable assembly suspends from building anchor 55 to the second chase vehicle 50 (dashed lines). The suspension cable assembly is now ready for rescue operation.

Figures 17, 18:
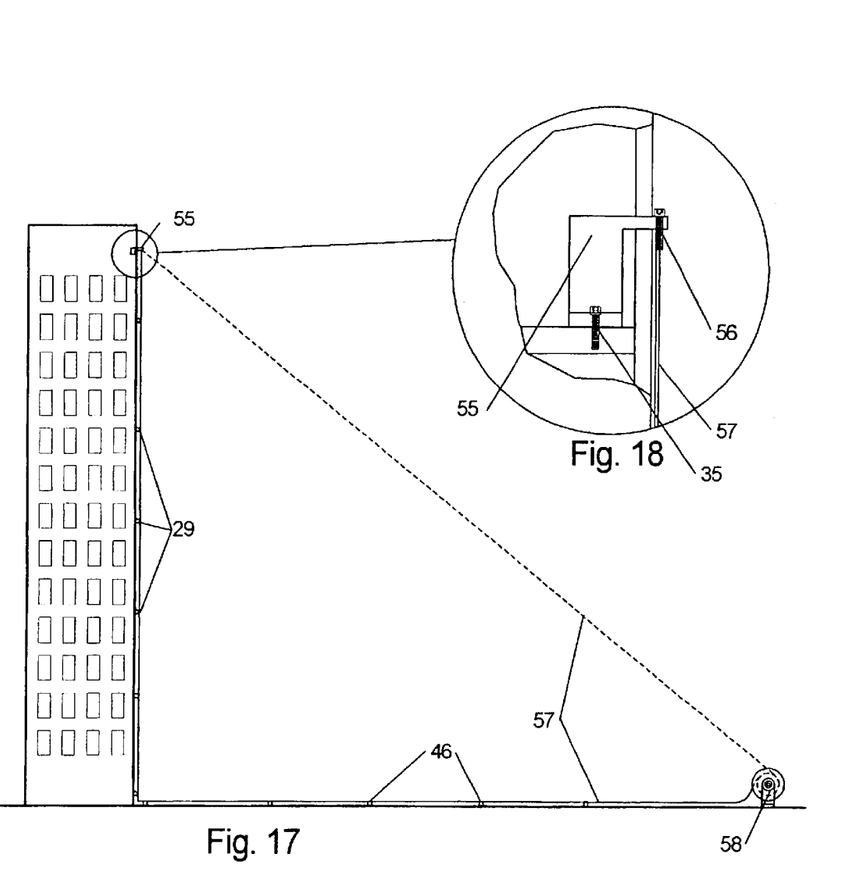
FIG. 17 is a side view of a high-rise building with a winch cable retraction.
FIG. 18 is an enlarged view of the fixed cable attachment.

FIG. 17 shows an alternate method that does not utilize a chase vehicle. The cable 57 extends from the building anchor 55 down the building and across the ground to the powered winch 58. In this configuration, the winch 58 would be activated upon a signal indicating an emergency suspension cable is needed. The activated winch would rotate, thus retracting the cable 57. The cable 57 would slide in the connectors 46 and then peel from the connectors 29. Eventually, the cable would peel from all the connectors and suspend from the building anchor 55 to the powered winch 58. An alternate method would include using a non-powered winch and the fireman bringing the power mechanism. Another alternative would include having the fireman bring a powered winch and making an attachment from the cable end to the powered winch.

FIG. 18 shows the building anchor 55. The cable 57 is securely attached to the building anchor 55 via attachment bolt 56. The building anchor 55 is securely attached to the building floor via attachment bolt 35. The building anchor 55 would be used rather than the cable spool 28 when no additional length of cable is needed to achieve the correct cable angle from the building upper floor to the ground.

Thus the scope of the invention should be determined by the appended claims and their legal equivalents, rather than by the examples given.

I claim:

1. A cable positioning system comprising:
    a. a cable with a first end and a second end, b. said first end is peelably attached to a first location, c. said second end is securely attached to a second location elevated in position relative to said first location, d. said cable is peelably attached from said first location to said second location, e. motorized means to move said first end from said first location to a third location distanced from said first location, f. after moving said first end to said third location, said cable suspends from said second location to said third location.

2. A cable positioning system as defined by claim 1 wherein said elevated second location is an upper floor of a high-rise building.

3. A cable positioning system as defined by claim 1 wherein said motorized means to move is a motorized vehicle.

4. A cable positioning system as defined by claim 1 wherein said cable is wound on a spool at said second location, said second end is securely attached to said spool, and said spool is securely attached to said elevated second location.

5. A cable positioning system as defined by claim 1 wherein peelably is accomplished with spring devices, or adhesive, or detachable parts.

6. A cable positioning system as defined by claim 1 wherein a portion of said cable is coiled in a receptacle containing said first end.

7. A cable positioning system as defined by claim 1 wherein said cable has both substantially vertical and substantially horizontal peelably attachment areas, and said cable is routed over an arcuate surface at the transition from said substantially horizontal area to said substantially vertical area.

8. A cable positioning system as defined by claim 7 wherein said arcuate surface is a pulley.

9. A cable positioning system comprising:

a. a cable with a first end and a second end, b. said first end is peelably attached to a first location, c. said second end is securely attached to a second location elevated in position relative to said first location, d. said cable is peelably attached from said first location to said second location, e. means to move said first end from said first location to an impediment distanced from said first location, f. a jumper cable with a first jumper end and a second jumper end, g. said jumper cable is peelably attached over said impediment, h. additional means to attach said first end to said first jumper end, i. further means to move said second jumper end from said impediment to a third location distanced from said impediment, j. after moving said first end to said impediment, connecting said second end to said first jumper end and moving said second jumper end to said third location, the connected said cable and said jumper cable suspends from said second location to said third location.

10. A cable positioning system as defined by claim 9 wherein said second location is an upper floor of a high-rise building.

11. A cable positioning system as defined by claim 9 wherein said means and said further means are motorized vehicles.

12. A cable positioning system as defined by claim 9 wherein peelably is accomplished with spring devices, or adhesive, or detachable parts.

13. A cable positioning system as defined by claim 9 wherein said jumper cable has both substantially vertical and substantially horizontal peelably attachment areas, and said cable is routed over an arcuate surface at the transition from said substantially horizontal area to said substantially vertical area.

14. A cable positioning system as defined by claim 13 wherein said arcuate surface is a pulley.

15. A cable positioning system comprising:

a. A cable with a first end and a second end, b. a cable retraction means at a first location, c. said first end is securely attached to said cable retraction means, d. said second end is securely attached to a second location displaced from said first location, e. said second location is on upper floor of a high-rise building, f. said cable is peelably attached from said first location to said second location, g. after retracting said cable via said cable retraction means, said cable suspends from said first location to said second location.

16. A cable positioning system as defined by claim 15 wherein said cable has both substantially vertical and substantially horizontal peelably attachment areas, and said cable is routed over an arcuate surface at the transition from said substantially horizontal area to said substantially vertical area.

17. A cable positioning system as defined by claim 15 wherein said cable retraction means is a winch.

18. A method of positioning a suspension cable, the method comprising:

a. providing a cable peelably attached from a base of a structure to an elevated position of said structure, b. attaching said cable from said base to a motorized vehicle, c. moving said motorized vehicle to a location distanced from said base, causing said cable to peel from said structure, resulting in said cable suspending from said location to said elevated position.

19. A cable positioning system as defined by claim 18 wherein said structure is a high-rise building.

* * * * *

UNITED STATES PATENT AND TRADEMARK OFFICE
CERTIFICATE OF CORRECTION

PATENT NO. : 6,895,716 B2  
DATED : May 24, 2005  
INVENTOR(S) : David Irwin Ellingson It is certified that error appears in the above-identified patent and that said Letters Patent is hereby corrected as shown below:

<u>Drawings,</u>
Sheet 4, replace FIG. 9 with corrected FIG. 9 shown below.

Fig. 9

UNITED STATES PATENT AND TRADEMARK OFFICE
CERTIFICATE OF CORRECTION

PATENT NO. : 6,895,716 B2  Page 2 of 4
DATED : May 24, 2005
INVENTOR(S) : David Irwin Ellingson It is certified that error appears in the above-identified patent and that said Letters Patent is hereby corrected as shown below:

Drawings (cont'd),
Sheet 5, replace FIG. 10 and FIG. 11 with corrected FIG. 10 and FIG. 11 shown below.

UNITED STATES PATENT AND TRADEMARK OFFICE
CERTIFICATE OF CORRECTION

PATENT NO.     : 6,895,716 B2
DATED          : May 24, 2005
INVENTOR(S)    : David Irwin Ellingson It is certified that error appears in the above-identified patent and that said Letters Patent is hereby corrected as shown below:

Drawings (cont'd),
Sheet 5, replace FIG. 12 with corrected FIG. 12 shown below.

UNITED STATES PATENT AND TRADEMARK OFFICE
CERTIFICATE OF CORRECTION

PATENT NO. : 6,895,716 B2
DATED : May 24, 2005
INVENTOR(S) : David Irwin Ellingson

It is certified that error appears in the above-identified patent and that said Letters Patent is hereby corrected as shown below:

Column 5,
Line 49, "FIG. 1" should be -- FIG. 11 --.

Column 8,
Line 2, "second" should be -- first --.

Signed and Sealed this

Twenty-seventh Day of September, 2005

JON W. DUDAS
*Director of the United States Patent and Trademark Office*